United States Patent
Rodier

(10) Patent No.: US 6,935,305 B1
(45) Date of Patent: Aug. 30, 2005

(54) METHOD AND APPARATUS FOR REDUCING WEAR OF VALVE ACTUATORS

(75) Inventor: William J. Rodier, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/806,849

(22) Filed: Mar. 23, 2004

(51) Int. Cl.⁷ .............................................. F02D 13/04
(52) U.S. Cl. ........................................ 123/321; 123/322
(58) Field of Search ................................ 123/321, 322, 123/90.16; 701/112, 70

(56) References Cited

U.S. PATENT DOCUMENTS

| | | | |
|---|---|---|---|
| 4,395,884 A | 8/1983 | Price | 60/602 |
| 4,572,114 A | 2/1986 | Sickler | 123/21 |
| 5,117,790 A | 6/1992 | Clarke et al. | 123/321 |
| 5,255,650 A | 10/1993 | Faletti et al. | 123/322 |
| 6,148,793 A * | 11/2000 | Faletti et al. | 123/322 |
| 6,394,067 B1 * | 5/2002 | Usko et al. | 123/321 |
| 6,591,798 B2 * | 7/2003 | Hendriksma et al. | 123/90.16 |
| 2003/0101952 A1 * | 6/2003 | Uehara et al. | 123/90.16 |
| 2003/0111031 A1 * | 6/2003 | Hendricksma et al. | 123/90.15 |
| 2003/0111044 A1 * | 6/2003 | Cotton et al. | 123/322 |
| 2003/0116124 A1 * | 6/2003 | Lawrence et al. | 123/305 |

* cited by examiner

*Primary Examiner*—John T. Kwon
(74) *Attorney, Agent, or Firm*—Marshall, Gerstein, & Borun LLP

(57) ABSTRACT

A control system for an internal combustion engine includes a plurality of valve actuators, each of which is operatively connected to at least one of a plurality of combustion chambers of the engine to open and/or hold open at least one valve associated with a combustion chamber. A controller is provided that is adapted to command the use of less than all of the valve actuators in a substantially balanced manner.

23 Claims, 3 Drawing Sheets

METHOD AND APPARATUS FOR REDUCING WEAR OF VALVE ACTUATORS

TECHNICAL FIELD

The present invention relates generally to engines and, more particularly, to controllers for engine valve actuators.

BACKGROUND

It is known in the prior art to provide electronic control systems and methods for controlling the operation of an engine in a number of modes. Control systems are known that are capable of controlling fuel injection timing and quantity, and inlet and exhaust valve opening and closing independently for each engine cylinder, for example, for operating an engine in a Miller cycle mode, an exhaust gas recirculation (EGR) mode, as well as for operating an engine in either a four-cycle braking mode or a two-cycle braking mode.

In conjunction with the increasingly widespread use of electronic controls in engine systems, braking systems have been developed which utilize valve actuators that are electronically controlled by a central engine control unit. Compression release engine brakes are used to assist and supplement wheel brakes in slowing heavy machines, such as tractor-trailers. Engine brakes are desirable because they help alleviate wheel brake overheating. Known compression release engine brakes convert an engine from a power generating unit into a power consuming air compressor.

Existing engine braking systems often exhibit high noise levels and a lack of smooth operation at some braking levels resulting from the use of less than all of the engine cylinders in a compression release braking scheme. For example, U.S. Pat. No. 4,395,884 discloses a compression release engine brake that includes a selector switch for activating brake solenoids on selected engine cylinders. However, if less than all engine cylinders are used for compression release braking, and a certain cylinder or group of cylinders are used repeatedly for compression release braking, while another cylinder or group of cylinders is not used as often for compression release braking, the actuator and other components associated with each cylinder that is used repeatedly are likely to experience additional thermal cycling and/or wear, as compared to the components associated with each cylinder that is not used as often for compression release braking. Such thermal cycling and/or wear can lead to excessive noise (for example, due to clattering of valve train components), leakage of hydraulic components, and/or component failure.

The present invention is directed to overcoming one or more of the problems or disadvantages associated with the prior art.

SUMMARY OF THE INVENTION

In accordance with one aspect of the invention, a control system for an internal combustion engine having a plurality of combustion chambers is provided. Each of the combustion chambers has at least one valve movable between a first position at which fluid is blocked from passing through the valve, and a second position at which fluid is permitted to pass through the valve. The control system includes a plurality of valve actuators. Each valve actuator is operatively connected to at least one of a plurality of valves, that in turn are each associated with at least one of a plurality of combustion chambers. Each valve actuator is adapted to be capable of opening and/or holding open at least one valve. A controller is operatively connected to the plurality of valve actuators and is adapted to command the use of one or more selected valve actuators of the plurality of valve actuators to provide substantially balanced usage over time of each of the plurality of valve actuators.

In accordance with another aspect of the invention, a method of valve actuation for an engine having a plurality of combustion chambers is provided. The valve actuation method includes determining that actuation of at least one valve associated with less than all of the combustion chambers is desired, and actuating the at least one valve associated with less than all of the combustion chambers in a substantially balanced manner over time.

DETAILED DESCRIPTION

Figure 1:
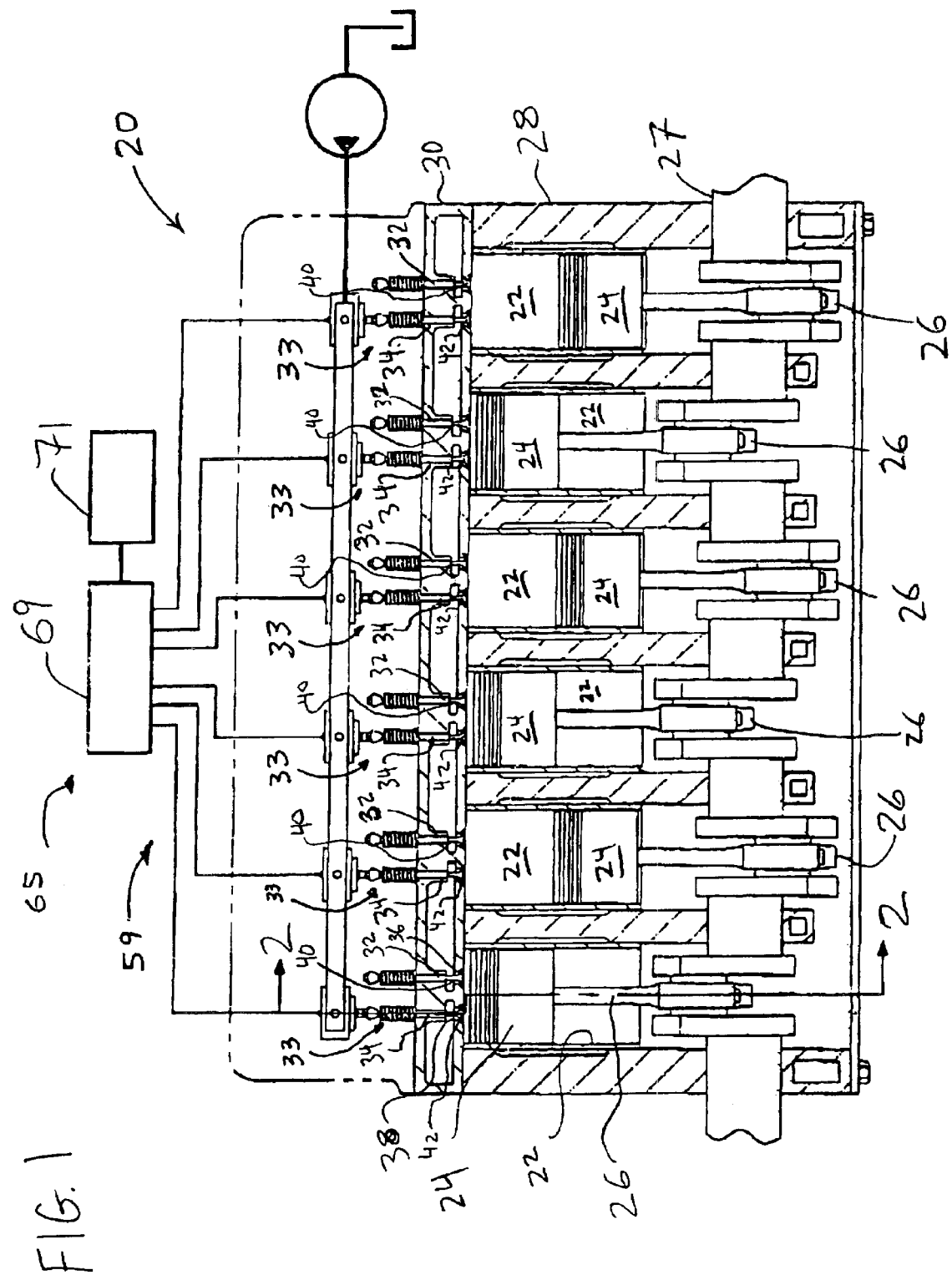
FIG. 1 is a diagrammatic cross-sectional view of an embodiment of an internal combustion engine, showing an engine block, a cylinder head, and a valve actuation system.

Referring now to the drawings, and with specific reference to FIG. 1, an embodiment of an internal combustion engine is indicated generally at reference numeral 20. The engine 20 is depicted and will be described in further detail herein with reference to a four-stroke, internal combustion engine. However, it is to be understood that the teachings of the invention can be employed in conjunction with any other type of engine (such as, for example, two-stroke engines or rotary engines) that might be capable of operating in a mode using valve actuators to operate engine valves (e.g., intake and/or exhaust valves) associated with less than all of the combustion chambers in the engine.

The engine 20 may include a plurality of engine cylinders 22 in each of which may be reciprocatingly mounted an engine piston 24. In the depicted embodiment, six such engine cylinders 22 and six engine pistons 24 are depicted in aligned fashion, but it is to be understood that a greater or lesser number are possible, and that engine cylinder orientations other than linear are possible as well. A connecting rod 26 may be connected to each engine piston 24, and in turn be connected to a crank shaft 27 so as to capitalize on the motion of the engine piston 24 to produce useful work in a machine (not shown) with which the engine 20 may be associated. Each engine cylinder 24 may be provided within an engine block 28 having a cylinder head 30, and may further be provided with at least one intake valve 32, and at least one means 33 for releasing pressure from the engine cylinder 24, such as, for example, an exhaust valve 34. The pressure releasing means 33 could take other forms, such as, for example, the intake valve 32 or a dedicated braking valve (not shown) used only for compression release braking.

Figure 2:
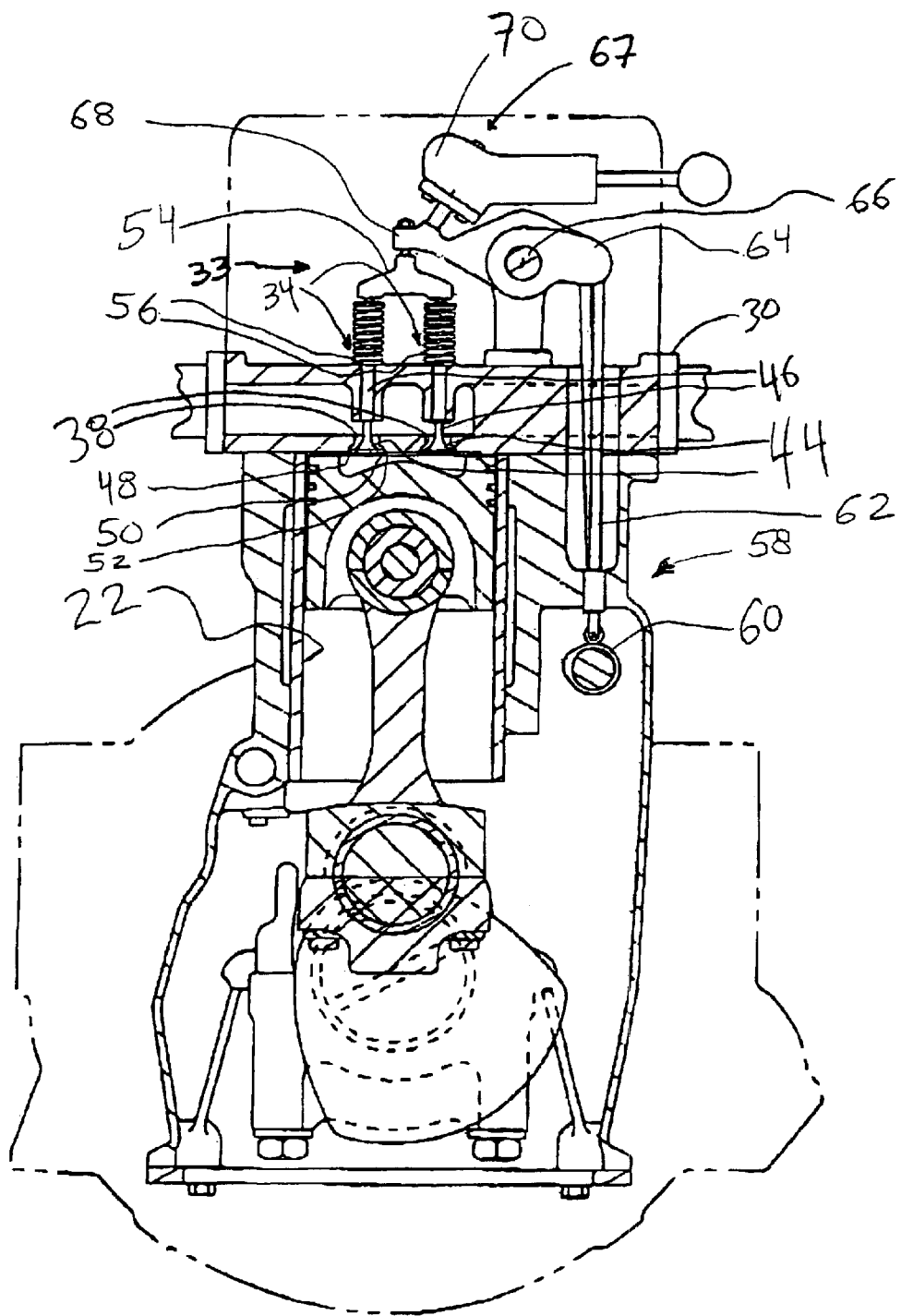
FIG. 2 is a cross-sectional view of the engine of FIG. 1, taken along line 2—2 of FIG. 1.

Referring now to FIG. 2, the cylinder head 30 and a pair of exhaust valves 34 are shown in greater detail for one of the engine cylinders 22. A pair of intake ports 36 (FIG. 1) and a pair of exhaust ports 38 may be provided in the cylinder head 30 to allow for fluid communication into and out of the engine cylinder 22. More specifically, in normal engine operation, intake air may be allowed to enter the engine cylinder 22 through the intake ports 36, while combustion or exhaust gases may be allowed to exit the engine cylinder 22 through the exhaust ports 38. An intake valve element 40 (FIG. 1) may be provided within each intake port 36, while an exhaust valve element 42 (FIG. 1) may be provided within each exhaust port 38.

Each of the valve elements 40, 42 may include a valve head portion 44 from which a valve stem 46 extends. The valve head portion 44 may include a sealing surface 48 adapted to seal against a valve seat 50 about a perimeter 52 of the valve ports 36, 38. The valve elements 40, 42 may further include a bridge 54 adapted to contact the valve stems 46 associated with each engine cylinder 22. A valve spring 56 may be provided to impart force between the top of each valve stem 46 and the cylinder head 30, thereby biasing the stem 46 away from the cylinder head 30 and thus biasing the valve head portions 44 into seating engagement with the corresponding valve seats 50 to close the intake and exhaust valves 32, 34.

As shown best in FIG. 2, movement of the valve elements 42 may be controlled not only by the springs 56, but by a cam assembly 58 as well. As one of ordinary skill in the art will readily recognize, rotation of a cam 60 periodically causes a push rod 62 to rise, thereby causing a rocker arm 64, connected thereto, to pivot about a pivot shaft 66. In so doing, an end 68 of the rocker arm 64 is caused to move downwardly and thereby open the exhaust valve element 42. Under normal engine operation, the cam 60 imparts sufficient force to the valve stem 46 to overcome the biasing force of the spring 56 and thereby push the valve head portion 44 away from the valve seat 50, to open the exhaust valves 34. Further rotation of the cam 60 allows the spring 56 to push the end 68 of the rocker arm 64 upward and the push rod 62 downward until the cam 60 completes another revolution.

In certain modes of engine operation, such as compression release braking, it may be desirable for the exhaust valves 34 to be held open for longer periods, and/or at a timing sequence other than that dictated by the cam 60. In such situations, a control system 59 that includes an actuator means 67 (such as, for example, a hydraulically, electrically, and/or mechanically driven actuator) including a valve actuator 70 may be used to so hold each exhaust valve 34 open. Each valve actuator 70 may be electronically or otherwise controlled by a control means 65 such as an engine brake controller 69 that may be connected to, or that may be a hardware and/or a software portion of, an engine control unit (ECU) 71, as shown in FIG. 1, and that also forms a portion of the control system 59.

When the engine 20 is operating in a compression release braking mode, the engine brake controller 69 may command fewer than all of the valve actuators 70 to operate. This can be done to produce partial braking (i.e., during situations that call for a relatively low level of braking power) or to avoid using all of the engine cylinders 22 for compression release braking in situations in which the use of all of the engine cylinders 22 for compression release braking would result in excessive loading of engine or drive train components.

To cause more uniform wear of engine components used for compression release braking, the engine brake controller 69 may be configured to command different ones of the valve actuators 70 in a substantially balanced manner over time.

INDUSTRIAL APPLICABILITY

Figure 3:
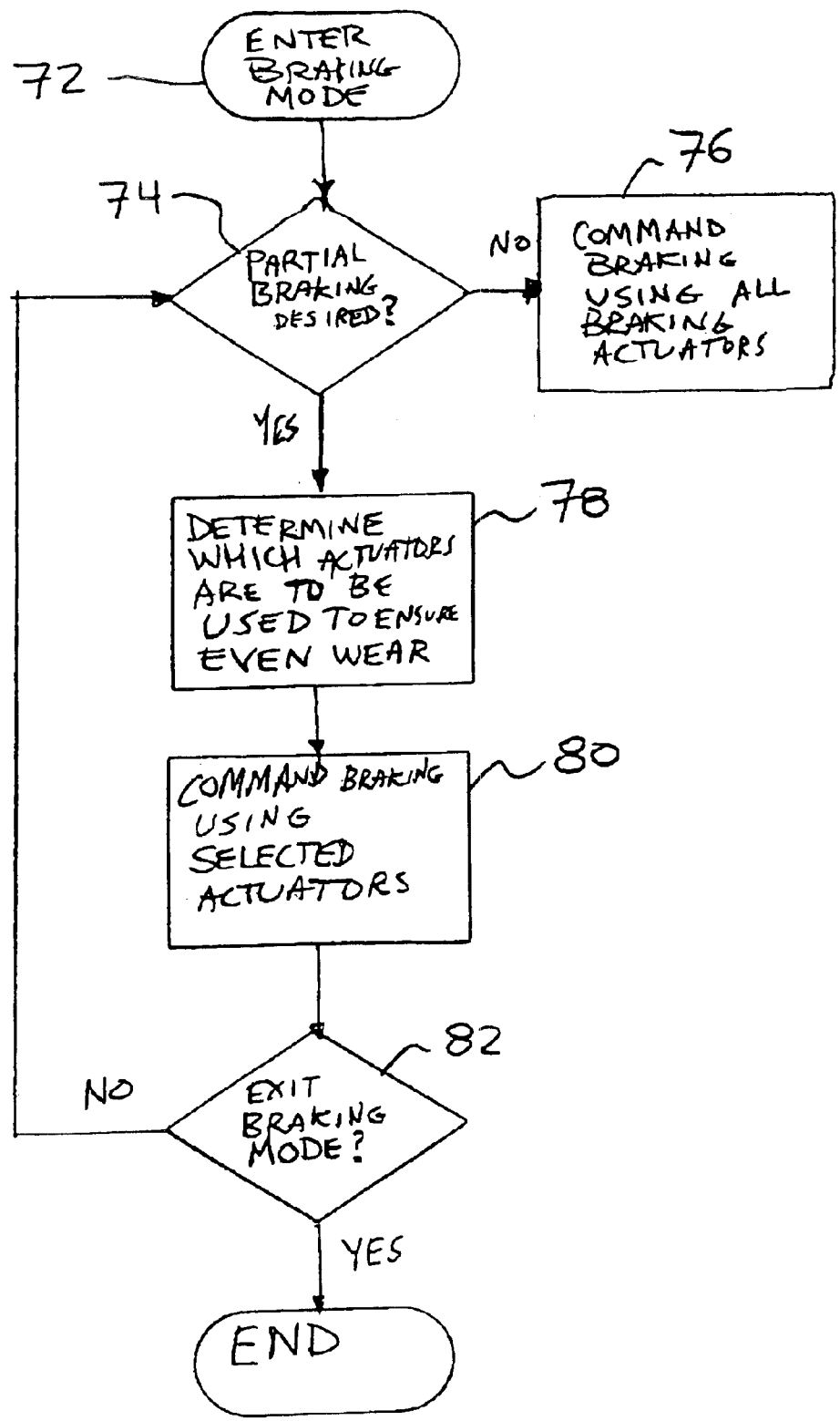
FIG. 3 is a logic diagram illustrating a system for, and method of, compression release braking using less than all combustion chambers of an engine.

With reference to FIG. 3, the following steps may be followed to cause more uniform wear of engine components during a compression release braking operation of the engine 20. First, at step 72, the engine brake controller 69 determines that a braking mode is desired (e.g., due to a command from the ECU 71, or from a manual switch (not shown)).

At step 74, the engine brake controller 69 determines whether partial braking is desired. If partial braking is not desired, the engine brake controller 69 may command braking using all of the valve actuators 70, at step 76. If partial braking is required or desired, at step 78, the engine brake controller 69 may determine which of the valve actuators 70 are to be used to encourage even component wear. Step 78 may use a patterned selection scheme, such as, for example, a sequential selection scheme (e.g., using a "for-next" logic loop to sequentially select one or more of the valve actuators 70 that were not used in a prior engine braking event) and/or a random selection scheme (e.g., using a random number generator), so that the valve actuators 70 are selected in a substantially balanced manner (e.g., by providing a substantially equal cycle time or alternatively, by providing a substantially equal number of cycles, for each valve actuator 70, over a given period of time or a given number of total actuator cycles or brake operation events). Step 78 may alternatively track and record in memory the number of times each actuator 70 has been selected and/or the amount of time each actuator 70 has been activated and select which of the actuator 70 to actuate next in response to the recorded data in a manner sufficient to cause more even component wear.

Next, at step 80, the engine brake controller 69 commands braking using the one or more of the valve actuators 70 that were selected at step 78. Then, at step 82, the engine brake controller 69 determines whether to exit the braking mode (again, e.g., due to a command from the ECU 71, or from a manual switch (not shown)). If the engine brake controller 69 determines that it is not appropriate to exit the braking mode, step 74 may be repeated and the process may be repeated as set forth above.

The steps 74 through 82 set forth in FIG. 3 may be repeated based on an event or a group of events (e.g., a compression release braking valve opening event or a revolution of the crank shaft 27), or a predetermined time (e.g., 0.10 second), as may be desired.

Numerous modifications and alternative embodiments of the invention will be apparent to those skilled in the art in view of the foregoing description. For example, the valve actuators 70 may be selected from any type of suitable actuator, such as, for example, electrically-driven actuators or electro-magnetically-driven actuators. In addition, the invention is applicable not only to valve actuation for engine braking, but may be used in connection with valve actuation for any engine operation that may entail use of less than all of the valves in an engine such as, for example, the use of intake valves and/or exhaust valves from some cylinders of a multi-cylinder engine for exhaust gas recirculation and/or Miller cycle operation or the use of fuel injectors from some cylinders or a multi-cylinder engine for lower power, and lower fuel consumption operation. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

Other aspects and features of the present invention can be obtained from a study of the drawings, the disclosure, and the appended claims.

What is claimed is:

1. A control system for an internal combustion engine having a plurality of combustion chambers, each said combustion chamber having at least one valve movable between a first position at which fluid is blocked from passing through the valve, and a second position at which fluid is permitted to pass through the valve, said control system comprising:
 a plurality of valve actuators, each of said valve actuators being operatively connected to at least one of a plurality of valves, that in turn are each associated with at least one of a plurality of combustion chambers and adapted to be capable of at least one of opening said at least one valve and holding open said at least one valve; and
 a controller operatively connected to said plurality of valve actuators and adapted to command the use of one or more selected valve actuators of said plurality of valve actuators to provide substantially balanced usage over time of each of said plurality of valve actuators.

2. The control system of claim 1, wherein said controller is adapted to command the use of said selected ones of said plurality of valve actuators using a patterned selection scheme.

3. The control system claim 1, wherein said controller is adapted to command the use of said selected ones of said plurality of valve actuators using a sequential selection scheme.

4. The control system of claim 1, wherein said controller is adapted to command the use of said selected ones of said plurality of valve actuators using a random selection scheme.

5. The control system of claim 1, wherein said substantially balanced usage over time is based on number of actuation events for each of said plurality of valve actuators.

6. The control system of claim 1, wherein said substantially balanced usage over time is based on accumulated actuation time for each of said plurality of valve actuators.

7. A control system for an internal combustion engine having a plurality of combustion chambers, each said combustion chamber having at least one valve movable between a first position at which fluid is blocked from passing through the valve, and a second position at which fluid is permitted to pass through the valve, said control system comprising:
 a plurality of valve actuators, each of said valve actuators being operatively connected to at least one of the plurality of said combustion chambers and adapted to cause the release of pressure from each of said combustion chambers to which said valve actuator is operatively connected; and
 a controller operatively connected to said plurality of valve actuators and adapted to command the use of less than all of said valve actuators in a substantially balanced manner.

8. The control system of claim 7, wherein said engine braking controller is adapted to command the use of less than all of said valve actuators using a patterned selection scheme.

9. The control system of claim 7, wherein said engine braking controller is adapted to command the use of less than all of said valve actuators using a sequential selection scheme.

10. The control system of claim 7, wherein said controller is adapted to command the use of less than all of said valve actuators using a random selection scheme.

11. The control system of claim 7, wherein said substantially balanced manner is based on number of actuation events for each of said plurality of valve actuators.

12. The control system of claim 7, wherein said substantially balanced manner is based on accumulated actuation time for each of said plurality of valve actuators.

13. A control system for an engine having a plurality of combustion chambers, said control system comprising:
 means for actuating at least one valve associated with each of at least two of said combustion chambers; and
 means for controlling said pressure releasing means, said controlling means being adapted to command the use of less than all of said actuating means in a substantially balanced manner over time.

14. The control system of claim 13, wherein said controlling means is adapted to command the use of less than all of said actuating means using a patterned selection scheme.

15. The control system of claim 13, wherein said controlling means is adapted to command the use of less than all of said actuating means using a sequential selection scheme.

16. The control system of claim 13, wherein said controlling means is adapted to command the use of less than all of said actuating means using a random selection scheme.

17. The control system of claim 13, wherein said substantially balanced manner over time is based on number of actuation events for each of said plurality of valve actuators.

18. The control system of claim 13, wherein said substantially balanced manner over time is based on accumulated actuation time for each of said plurality of valve actuators.

19. A method of valve actuation for an engine having a plurality of combustion chambers, said valve actuation method comprising:
 determining that actuation of at least one valve associated with less than all of said combustion chambers is desired; and
 actuating said at least one valve associated with less than all of said combustion chambers in a substantially balanced manner over time.

20. The method of claim 19, wherein the substantially balanced manner includes a patterned scheme for selection of said at least one valve that is to be actuated.

21. The method of claim 19, wherein the substantially balanced manner includes a random scheme for selection of said at least one valve that is to be actuated.

22. The control system of claim 19, wherein said substantially balanced manner over time is based on number of actuation events for each of said plurality of valve actuators.

23. The control system of claim 19, wherein said substantially balanced manner over time is based on accumulated actuation time for each of said plurality of valve actuators.

* * * * *